US012342018B2

(12) United States Patent
Kamimaki et al.

(10) Patent No.: US 12,342,018 B2
(45) Date of Patent: *Jun. 24, 2025

(54) CONTENTS RECEIVING SYSTEM AND CLIENT

(71) Applicant: MAXELL, LTD., Kyoto (JP)

(72) Inventors: Hideki Kamimaki, Fujisawa (JP); Akira Date, Kunitachi (JP); Akira Tanaka, Kawasaki (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/815,326

(22) Filed: Aug. 26, 2024

(65) Prior Publication Data

US 2024/0422373 A1 Dec. 19, 2024

Related U.S. Application Data

(63) Continuation of application No. 17/665,891, filed on Feb. 7, 2022, now Pat. No. 12,101,521, which is a
(Continued)

(30) Foreign Application Priority Data

Sep. 27, 2006 (JP) .................................. 2006-261645

(51) Int. Cl.
*H04N 21/2543* (2011.01)
*H04N 7/16* (2011.01)
(Continued)

(52) U.S. Cl.
CPC ......... *H04N 21/2543* (2013.01); *H04N 7/163* (2013.01); *H04N 21/4122* (2013.01);
(Continued)

(58) Field of Classification Search
None
See application file for complete search history.

(56) References Cited

U.S. PATENT DOCUMENTS 5,721,583 A  2/1998  Harada et al.
6,862,741 B1  3/2005  Grooters
(Continued)

FOREIGN PATENT DOCUMENTS

EP  1517464 A2  3/2005
JP  11-196345 A  7/1999
(Continued)

OTHER PUBLICATIONS

JP Notice of Rejections for Application No. 2012-126692, issued on May 21, 2013.
(Continued)

*Primary Examiner* — Qin Zhu
(74) *Attorney, Agent, or Firm* — Mattingly & Malur, PC

(57) ABSTRACT

A method of reproducing audio content between a main terminal including a first speaker and a plurality of subsidiary terminals including a second speaker. Device specific identification (ID) information of the subsidiary terminals and association information for transmitting one of the audio data of the audio content to one of the subsidiary terminals are stored. The association information defines that one of the audio data of the audio content is associated with one of the device specific ID information. The subsidiary terminals transmit/receive with the main terminal and the device specific ID information is transmitted from the subsidiary terminals to the main terminal when connecting to the main terminal. The encoded audio data of the audio content is transmitted to the subsidiary terminals based on the association information, then is decoded and the subsidiary terminals output the audio data to the second speaker.

20 Claims, 8 Drawing Sheets

Related U.S. Application Data continuation of application No. 16/855,012, filed on Apr. 22, 2020, now Pat. No. 11,277,650, which is a continuation of application No. 16/387,841, filed on Apr. 18, 2019, now abandoned, which is a continuation of application No. 15/602,417, filed on May 23, 2017, now abandoned, which is a continuation of application No. 14/467,076, filed on Aug. 25, 2014, now abandoned, which is a continuation of application No. 13/972,624, filed on Aug. 21, 2013, now Pat. No. 8,819,747, which is a continuation of application No. 11/861,390, filed on Sep. 26, 2007, now Pat. No. 8,544,049.

(51) Int. Cl.
| | | |
|---|---|---|
| *H04N 21/41* | (2011.01) | |
| *H04N 21/434* | (2011.01) | |
| *H04N 21/436* | (2011.01) | |
| *H04N 21/4363* | (2011.01) | |
| *H04N 21/4402* | (2011.01) | |
| *H04N 21/45* | (2011.01) | |
| *H04N 21/454* | (2011.01) | |
| *H04N 21/478* | (2011.01) | |
| *H04N 21/488* | (2011.01) | |
| *H04N 21/81* | (2011.01) | |
| *H04N 21/84* | (2011.01) | |
| *H04N 21/858* | (2011.01) | |

(52) U.S. Cl.
CPC ... *H04N 21/4126* (2013.01); *H04N 21/41265* (2020.08); *H04N 21/4341* (2013.01); *H04N 21/4348* (2013.01); *H04N 21/43615* (2013.01); *H04N 21/43637* (2013.01); *H04N 21/440218* (2013.01); *H04N 21/440263* (2013.01); *H04N 21/4516* (2013.01); *H04N 21/454* (2013.01); *H04N 21/478* (2013.01); *H04N 21/488* (2013.01); *H04N 21/4884* (2013.01); *H04N 21/8106* (2013.01); *H04N 21/812* (2013.01); *H04N 21/84* (2013.01); *H04N 21/8586* (2013.01); *H04R 2227/005* (2013.01)

(56) References Cited

U.S. PATENT DOCUMENTS

| | | |
|---|---|---|
| 7,266,834 B1 | 9/2007 | Lund et al. |
| 2001/0019326 A1 | 9/2001 | Yuasa et al. |
| 2002/0137496 A1 | 9/2002 | Nagaoka et al. |
| 2002/0150387 A1 | 10/2002 | Kunii et al. |
| 2002/0194299 A1 | 12/2002 | Yasaki et al. |
| 2003/0007640 A1 | 1/2003 | Harada et al. |
| 2003/0237093 A1 | 12/2003 | Marsh |
| 2004/0184619 A1* | 9/2004 | Inagaki ............ H04R 5/04 340/310.11 |
| 2005/0155078 A1 | 7/2005 | Imada et al. |
| 2005/0221826 A1 | 10/2005 | Lee et al. |
| 2006/0053447 A1* | 3/2006 | Krzyzanowski ............ H04N 21/44227 725/40 |
| 2006/0268169 A1 | 11/2006 | Han et al. |
| 2007/0208789 A1 | 6/2007 | Reichman et al. |
| 2007/0202900 A1 | 8/2007 | Inselberg et al. |
| 2008/0008338 A1* | 1/2008 | Yoon ............ H04R 5/02 381/303 |

FOREIGN PATENT DOCUMENTS

| | | |
|---|---|---|
| JP | 2002-125167 A | 4/2002 |
| JP | 2002-169747 A | 6/2002 |
| JP | 2004-254122 A | 9/2004 |
| JP | 2005-150956 A | 6/2005 |
| JP | 2005-184499 A | 7/2005 |
| JP | 2005-198061 A | 7/2005 |
| JP | 2005-259045 A | 9/2005 |
| WO | 02/07334 A1 | 1/2002 |

OTHER PUBLICATIONS

JP Office Action for Japanese Application No. 2013-145973, issued on Apr. 8, 2014.

* cited by examiner

FIG.8

| SUBSIDIARY CONTENT CONTROL RECEIVER | REQUESTED INFORMATION | IP ADDRESS ASSIGNED TO EACH SUBSIDIARY CONTENT CONTROL RECEIVER |
|---|---|---|
| A | EPG DATA | 201.202.203.204 |
| B | ENGLISH AUDIO DATA | 201.202.203.205 |
| C | ENGLISH AUDIO DATA/ SUBTITLE DATA | 201.202.203.205 |
| ⋮ | ⋮ | ⋮ |
| Z | ECG DATA | 202.203.204.2xx |

CONTENTS RECEIVING SYSTEM AND CLIENT

CROSS REFERENCE TO RELATED APPLICATION

This is a continuation of U.S. application Ser. No. 17/665,891, filed Feb. 7, 2022, which is a continuation of U.S. application Ser. No. 16/855,012, filed Apr. 22, 2020 (now U.S. Pat. No. 11,277,650), which is a continuation of U.S. application Ser. No. 16/387,841, filed Apr. 18, 2019, now abandoned, which is a continuation of U.S. application Ser. No. 15/602,417, filed May 23, 2017, now abandoned, which is a continuation of U.S. application Ser. No. 14/467,076, filed Aug. 25, 2014, now abandoned, which is a continuation of U.S. application Ser. No. 13/972,624, filed Aug. 21, 2013 (now U.S. Pat. No. 8,819,747), which is a continuation of U.S. application Ser. No. 11/861,390, filed Sep. 26, 2007 (now U.S. Pat. No. 8,544,049). This application relates to and claims priority from Japanese Patent Application No. 2006-261645, filed on Sep. 27, 2006. The entirely of the contents and subject matter of all of the above is incorporated herein by reference.

BACKGROUND OF THE INVENTION

Part of the present invention relates to technologies for receiving video content through two-way broadcasting, for example, through a digital broadcast wave and/or a network.

A stream including digitized video content is broadcasted and delivered to a receiving terminal unit located in each home through digital broadcasting or a broadband network (for example, FTTH: Fiber to the Home). This stream can include not only main video content such as a television program, but also various kinds of subsidiary contents including a data broadcast, advertising information (commercial information) of a commodity, information relating to broadcast programs, subtitle data, and an electronic program guide (EPG).

At this time, if the main content and the subsidiary content are simultaneously displayed on a television receiver that is a typical receiving terminal unit, each display area used to display each content becomes narrower, and accordingly it becomes relatively difficult for a user to view each content.

For the purpose of solving such a problem, for example, JP-A-2002-169747 and JP-A-2005-198061 described below disclose that main content is displayed on a main receiving terminal unit, whereas subsidiary content is displayed on, for example, a subsidiary receiving terminal unit such as portable communications equipment and a remote control unit.

SUMMARY OF THE INVENTION

As described above, it is possible to provide a user with various kinds of information as subsidiary content. Here, even if each individual belongs to the same family, subsidiary content desired by one family member may differ from that desired by another family member. For example, if commercial information and a data broadcast are provided as subsidiary contents, there is a case where one family member wants to acquire the commercial information, whereas another family member wants to acquire news of the data broadcast.

Therefore, it is desirable that an information receiving terminal unit used at home, such as a television receiver, be capable of providing main content to be shared among the family members, and also be capable of providing subsidiary content in response to each family member's taste to allow viewing of the subsidiary content on an individual basis. However, in the above-described JP-A-2002-169747 and JP-A-2005-198061, such personalization of subsidiary content is not taken into consideration.

For this reason, the present invention provides a technology that is suitable for personalizing subsidiary content, which is transmitted together with main content, in response to user's taste in, for example, a system for receiving content through a digital broadcast wave and/or a network.

As a specific example, there are provided a main receiving terminal unit, and a plurality of subsidiary receiving terminal units, each of which is capable of transmitting/receiving data. Each of the subsidiary receiving terminal units is provided with specific ID (identification) information. Subsidiary content corresponding to ID information is transmitted from the main receiving terminal unit to a subsidiary receiving terminal unit having the ID information.

According to the above-described configuration, for example, while family members view the main content such as a television program by use of a large-screen main receiving terminal unit (for example, a television receiver), information and data which each family member wants to know can be acquired by use of a subsidiary receiving terminal unit held by the each family member.

According to embodiments of the present invention, for example, it becomes possible to personalize subsidiary content in response to user's taste, and to provide each user with the subsidiary content.

BRIEF DESCRIPTION OF THE DRAWINGS

FIG. 8 is a diagram illustrating an example of table information stored in a main content receiving display unit.

DESCRIPTION OF THE EMBODIMENTS

Embodiments of the present invention will be described with reference to drawings as below.

First Embodiment

First of all, an example of a content receiving terminal system will be described with reference to FIG. 1.

Figure 1:
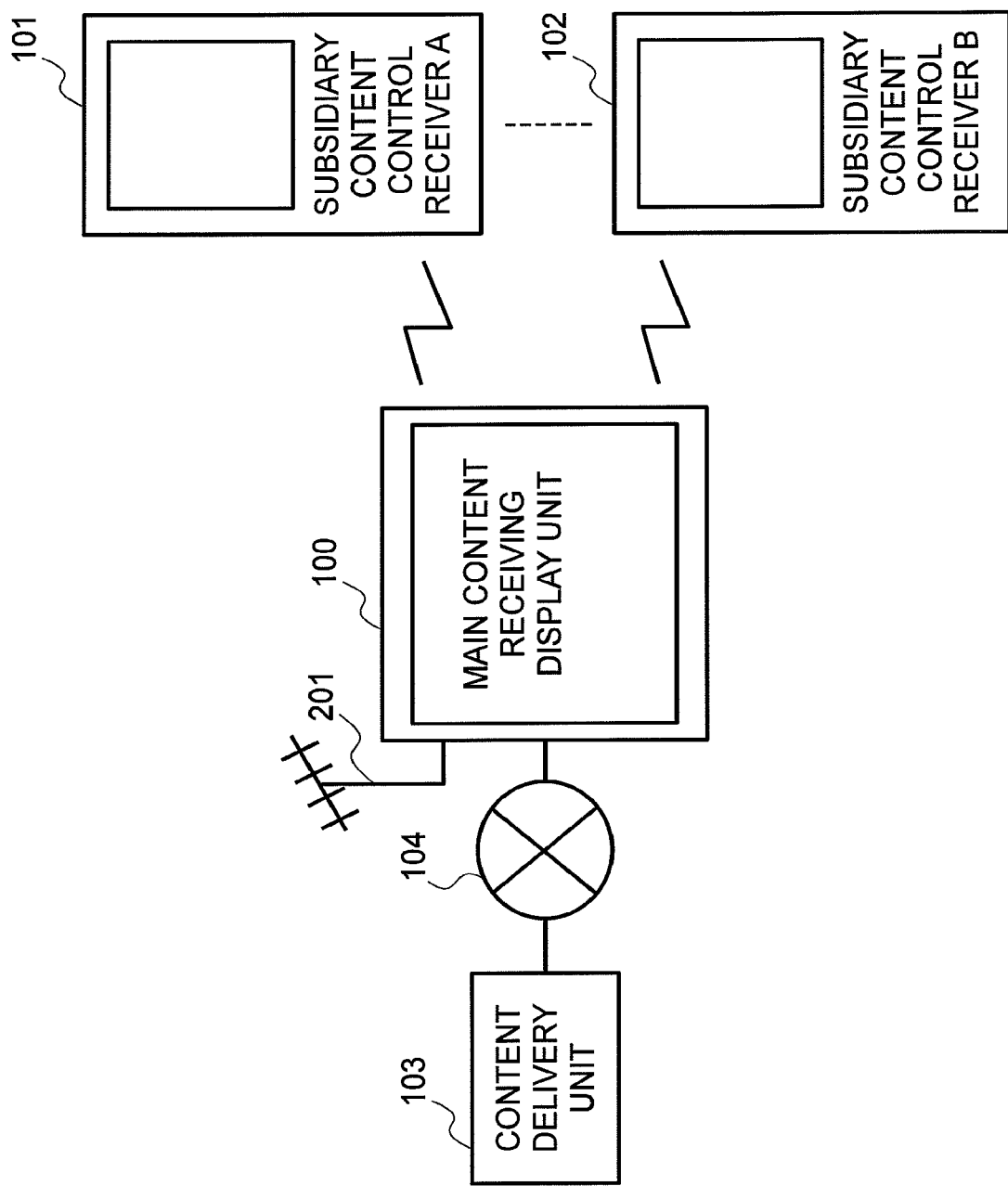
FIG. 1 is a diagram illustrating an example of a contents receiving system.

In FIG. 1, through broadband Internet 104, a main content receiving display unit 100, which is a main receiving terminal unit, receives a stream delivered from a content delivery unit 103, and then displays main content. Here, it is assumed that the main content is multiplexed with subsidiary content to form a stream. In addition, the main content receiving display unit 100 includes a broadcast receiver 201. Accordingly, the main content receiving display unit 100 also receives television broadcast signals of broadcasting services such as digital terrestrial broadcasting, digital BS/CS broadcasting services, and analog broadcasting. If a television broadcast signal to be received is a digital broadcast signal, as is the case with the above, a stream into which the main content and the subsidiary content are multiplexed is received. Then, the main content is displayed on the display unit. Here, the main content receiving display unit 100 is a television receiver. Moreover, according to this embodiment, it is possible to receive both a stream coming from the broadband Internet 104 and a stream coming from television broadcasting. However, it may also be so configured that either of them can be received.

Incidentally, in this embodiment, the main content is, for example, moving picture content such as a television program. More specifically, the main content in this embodiment is video content that is displayed on the main content receiving display unit 100, and that can be viewed in common by family members.

On the other hand, each of subsidiary content control receivers A 101, B 102, which are subsidiary receiving terminal units, is devised to receive desired subsidiary content from the main content receiving display unit 100, and then to display the subsidiary content on the display unit, the desired subsidiary content being selected from among streams received by the main content receiving display unit 100.

Here, the subsidiary content includes, for example, Multilanguage audio data (including Japanese audio data and English audio data), an electronic program guide used to program recording of a broadcast program (hereinafter referred to as "EPG"), an electronic content table that is delivered from the content delivery unit 103 (hereinafter referred to as "ECG" (Electric Contents Guide)), and additional information (including subtitle data and commercial information). In addition, the subsidiary content may also be content information obtained by down-converting the main content (for example, by converting from the HD (High Definition) resolution into the SD (Standard Definition) resolution), and/or content information obtained by transforming an encoding method of the main content (for example, by transforming from the MPEG-2 (Motion Picture Expert Group) to the MPEG-4). In this case, the content information is subjected to copyright protection in response to characteristics of the content information. Moreover, if each of the subsidiary content control receivers A 101, B 102 has a browser function of browsing Internet sites, the subsidiary content information may also be home page data (address information, and URL (Uniform Resource Locator)) on Internet and metadata.

In addition, according to this embodiment, each of the subsidiary content control receivers A 101, B 102 transmits/receives information and data to/from the main content receiving display unit 100 through a wireless network (for example, a wireless LAN). As a matter of course, instead of using the wireless network, a wired network may also be used. Moreover, it is desirable to design the subsidiary content control receiver to be portable (transportable) so that the subsidiary content control receiver can be placed near at hand of a user. Accordingly, the size of a display unit of the subsidiary content control receiver is made smaller than the display size of the main content receiving display unit 100.

In this embodiment, as described below, ID information which is specific identification information is given to, or stored in, each of the plurality of subsidiary content control receivers A 101, B 102. If the subsidiary content control receiver A 101 or B 102 issues an acquisition request to acquire desired subsidiary content, not only the acquisition request but also ID information of the subsidiary content control receiver in question are transmitted to the main content receiving display unit 100. On the receipt of the acquisition request and the ID information, the main content receiving display unit 100 transmits the requested desired subsidiary content to the outside together with the received ID information. To be more specific, the main content receiving display unit 100 adds the ID information to the requested subsidiary content before transmitting the requested subsidiary content. Then, the subsidiary content control receiver receives, from the main content receiving display unit 100, the subsidiary content to which the ID information has been added. Only when ID information stored in the subsidiary content control receiver in question agrees with the ID information that has been received together with the subsidiary content, the subsidiary content control receiver in question acquires the subsidiary content. As a result, each of the plurality of subsidiary content control receivers A 101, B 102 can display the subsidiary content corresponding to each ID information, and/or output audio data of the subsidiary content corresponding to each of ID information.

For example, when the main content receiving display unit 100 receives a stream that is formed by multiplexing movie image data, which is provided as main content, with EPG data and supplementary audio data that are provided as subsidiary content, the subsidiary content control receiver A 101 can receive the EPG data from the main content receiving display unit 100 to display the EPG data, whereas the subsidiary content control receiver B 102 can receive the supplementary audio data to output the supplementary audio data. At this time, the main content receiving display unit 100 displays the movie that is the main content.

Further, each of the subsidiary content control receivers A 101, B 102 has a web site browsing request function. Accordingly, the subsidiary content control receivers A 101, B 102 are also configured to be capable of acquiring information from a web site on the basis of information including a URL that is linked to the main content.

Thus, according to this embodiment, the whole family members can enjoy video by use of the main content receiving display unit 100 that is formed of, for example, a large screen television receiver to be located in a living room as family use. In addition to it, it is possible to individually enjoy the subsidiary content by use of the subsidiary content control receiver that can be possessed by each family member. Therefore, according to this embodiment, the usability of the content receiving terminal unit is improved, and it becomes possible to provide video delivery services that suit the taste of each individual.

Moreover, according to the configuration described in this embodiment, a recording operation screen can also be displayed in the subsidiary content control receiver. Accordingly, recording operation can be carried out without displaying the recording operation screen on a screen of the main content receiving display unit 100, to which the family members are paying attention. Therefore, without hindering the family members from viewing the video content displayed on the main content receiving display unit 100, it is possible to carry out operation including downloading of a broadcast program on an individual basis concurrently with the viewing of the video content. Further, the main content receiving display unit 100 acquires information about functions of the subsidiary content control receivers 101A, 101B. For example, the main content receiving display unit 100 acquires the display resolution, information about content-image format processing functions such as H.264 and MPEG-4, and information about audio processing functions such as AAC or MP3. Then, the main content receiving display unit 100 converts a format of the main content into that of the subsidiary content corresponding to terminal information of a target that is either the subsidiary content control receiver 101A or 101B. Accordingly, it becomes possible not only to provide desired content information, but also to provide content corresponding to each of the subsidiary content control receivers 101A, 101B. Moreover, an individual who uses each of the subsidiary content control receivers 101A, 101B can also be identified by use of specific ID information of each of the subsidiary content control receivers 101A, 101B. Furthermore, it is also possible to give the authority to set the parental control, and to give the authority to allow the purchase of content. Accordingly, users can view content without anxiety.

Figure 2:
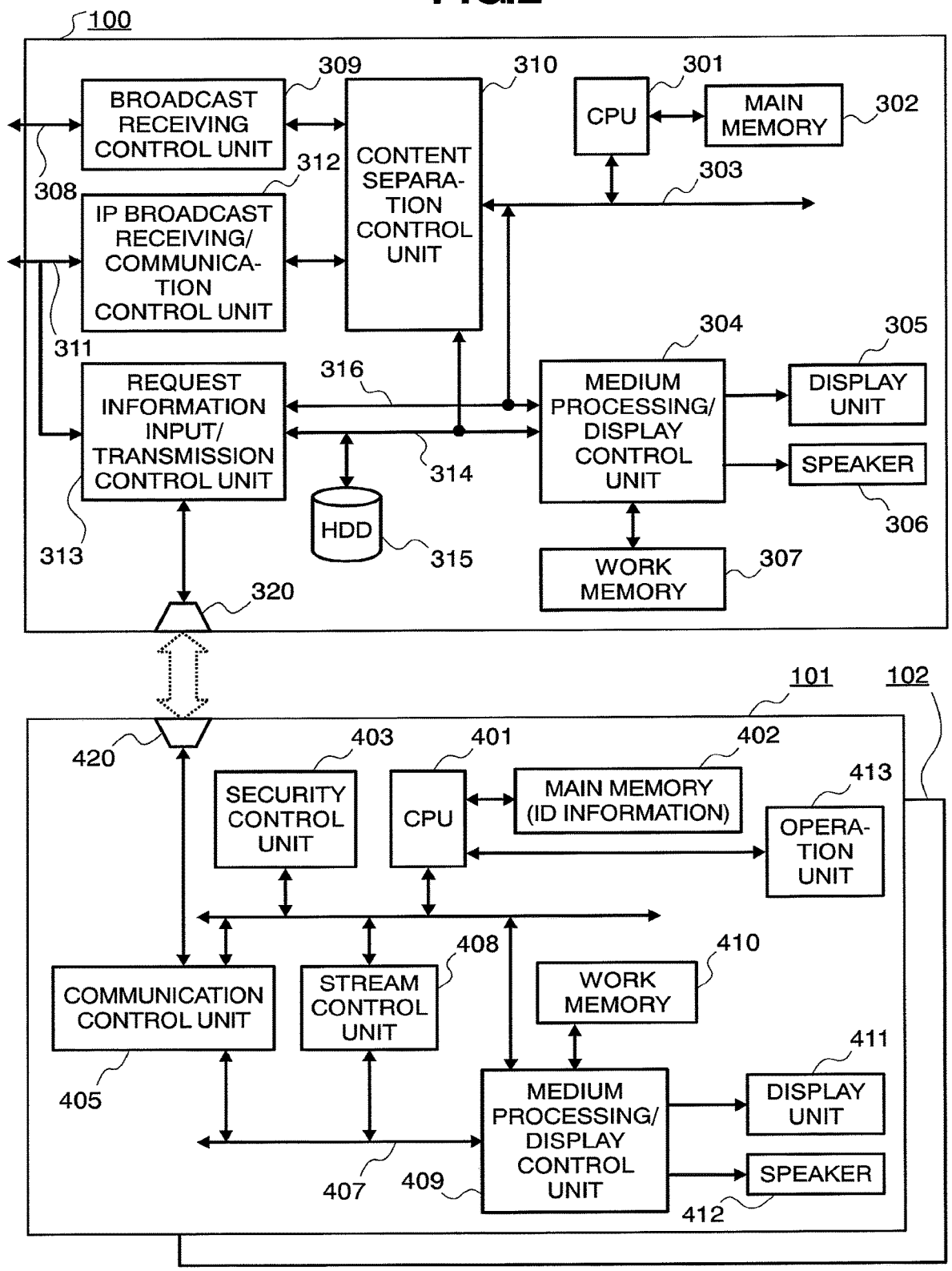
FIG. 2 is a diagram illustrating a specific example of a contents receiving system.

Next, one specific example of a contents receiving system according to this embodiment will be described with reference to FIG. 2. In this example, a case where a television receiver is used as the main content receiving display unit 100 will be described.

First of all, a specific example of the main content receiving display unit 100 will be described. A broadcast receiving control unit 309 includes, for example, a tuner for selecting a channel of television broadcasting. The broadcast receiving control unit 309 performs channel selecting operation on the basis of a switching signal generated by operation of a remote control unit. As a result, a stream of a television broadcast signal (terrestrial analog/digital broadcast signals, BS/CS analog/digital broadcast signals) of a desired channel is received. In addition, each of the subsidiary content control receivers A 101, B 102 and the remote control unit may also be used in combination. In this case, a request information input/transmission control unit 313 acquires channel information based on an instruction by a user, the channel information having been transmitted from each of the subsidiary content control receivers A 101, B 102. The channel information is then analyzed by a content separation control unit 310. After that, the content separation control unit 310 uses the channel information to control channel selection of a tuner included in the broadcast receiving control unit 309. This also enables the subsidiary content control receiver A 101 or B 102 to select a channel of a broadcast program received through a broadcast wave I/F 308.

Moreover, through, for example, a network I/F 311 formed of broadband Internet, an IP (Internet Protocol) broadcast receiving/communication control unit 312 receives, for example, a stream that is encoded by MPEG-2, or the like. This network I/F 311 may also be connected to a home network used to communicate with an electrical apparatus used at home and/or each of the subsidiary content control receivers A 101, B 102 so that a stream is received through both the home network and the network I/F 311.

As described above, a stream which is received by the broadcast receiving control unit 309 and the IP broadcast receiving/communication control unit 312 includes: main content including moving picture content; and subsidiary content including subtitle data, EPG data, supplementary audio data, and other broadcast program related information.

The content separation control unit 310 separates the stream into main content and subsidiary content, the stream being received by the broadcast receiving control unit 309 and the IP broadcast receiving/communication control unit 312. The content separation control unit 310 separates the stream into the subsidiary content in response to an acquisition request that has been received from each of the subsidiary content control receivers A 101, B 102 by the request information input/transmission control unit 313. For example, when the subsidiary content control receiver A 101 transmits an acquisition request to acquire supplementary audio data (for example, English audio), the request information input/transmission control unit 313 receives the acquisition request, and changes a format to a desired content data format on the basis of ID information, and then transmits the format to a CPU 301 through a request information control I/F 316 and a control I/F 303.

According to a program stored in a main memory 302, the CPU 301 analyzes the acquisition request, and then generates control information corresponding to the acquisition request. In this example, because the acquisition request is a request to acquire supplementary audio, the CPU 301 generates control information that is used to separate the received stream into supplementary audio data so as to extract the supplementary audio data as subsidiary content. The CPU 301 then gives the control information to the content separation control unit 310 through the control I/F 303. In response to the control information, the content separation control unit 310 uses a medium processing/display control unit 304 to extract the supplementary audio data, and then supplies the supplementary audio data to the request information input/transmission control unit 313 through a content data I/F 314. After that, the supplementary audio data in question is supplied from the request information input/transmission control unit 313 to, for example, a radio interface unit (main) 320 for performing data communications with infrared rays by means of light modulation. The radio interface unit (main) 320 transmits the supplied supplementary audio data to the subsidiary content control receiver A 101 by means of radio transmission.

Here, the request information input/transmission control unit 313 performs encoding control so that the subsidiary content is compressed and encoded by the medium processing/display control unit 304. Then, the content information obtained by compressing and encoding the subsidiary content is packeted into communication packets, the subsidiary content having been extracted as a result of the separation of the received stream by the medium processing/display control unit 304 in response to the request information. The radio interface unit (main) 320 transmits, by radio, this encoded and packeted subsidiary content to the subsidiary content control receiver. An encoding unit of the medium processing/display control unit 304 compresses and encodes not only audio data but also image data.

In addition, the subsidiary content control receiver A 101 or B 102 transmits ID information specific to the subsidiary content control receiver in question together with the acquisition request to acquire the subsidiary content. This ID information is temporarily stored in the request information input/transmission control unit 313. After that, the request information input/transmission control unit 313 adds the temporarily stored ID information to EPG data that has been extracted as a result of the separation of the received stream by the content separation control unit 310. The request information input/transmission control unit 313 then transmits the EPG data from the radio interface unit (main) 320 to the subsidiary content control receiver side. Details thereof will be described later.

On the other hand, main content data, into which the content separation control unit 310 has separated the received stream, is supplied to the medium processing/display control unit 304 through the content data I/F 314. The medium processing/display control unit 304 executes specified image and audio processing by use of a working memory 307. In this case, the medium processing/display control unit 304 supplies video data of the main content to a display unit 305, and supplies audio data of the main content to a speaker 306. As a result, the video and audio outputs of the main content are performed. Incidentally, the display unit 305 may also be, for example, a plasma display panel or a liquid crystal panel.

In addition, the medium processing/display control unit 304 has a function of processing subsidiary content data that has been extracted as a result of the separation of the received stream by the content separation control unit 310. Here, it may also be so devised that this subsidiary content is subjected to desired image processing before the subsidiary content is supplied to the request information input/transmission control unit 313 and the radio interface unit (main) 320. The image processing for the subsidiary content is executed in response to a request from the subsidiary content control receiver A 101 or B 102. For example, when a request to convert a video format is issued from the subsidiary content control receiver A 101 or B 102, the medium processing/display control unit 304 converts a video format of the subsidiary content. For example, if an encoding method for encoding the subsidiary content is MPEG-2, the video format of the subsidiary content is converted into, for example, a video format corresponding to the capability of the subsidiary content control receiver in question (for example, MPEG-4 or H.264).

A HOD 315 is connected to the content separation control unit 310 through the content data I/F 314. The HOD 315 mainly records the main content obtained as a result of the separation by the content separation control unit 310. As a matter of course, the subsidiary content may also be recorded to the HOD 315. The HOD 315 may also be used as a substitute for the working memory 307 used to convert the video format as described above. Recording operation in the HOD 315 is executed in response to a recording request from the remote control unit or from the subsidiary content control receiver A 101 or B 102 that is used together with the remote control unit. In addition, it may also be so devised that the subsidiary content, which has been recorded to the HOD, is transmitted to the subsidiary content control receiver in question through the request information input/transmission control unit 313 and the radio interface unit (main) 320. Moreover, the main content recorded to the HOD 315 may also be transmitted to the subsidiary content control receiver in question in like manner. In this case, the medium processing/display control unit 304 may convert a format of the main content into a format that conforms to a display format of the subsidiary content control receiver in question, before the main content is transmitted. For example, if video data of the main content has a resolution of 1980×1080, whereas a display unit 411 of the subsidiary content control receiver in question has a resolution of 320×240, the definition of the main content may also be changed by the medium processing/display control unit 304 to suit the resolution of the display unit 411. To be more specific, the main content may also be converted into signals whose number of pixels is 320×240.

In addition, the content separation control unit 310 also has a function of managing information including: information about contract channels as fee-based services, and billing thereof; information used for the copyright protection; and information about the copyright of video content. Then, for example, user contractual coverage of a digital broadcast of a desired channel is checked by use of the above-described management information. If necessary, authentication processing and decryption processing are performed. This makes it possible to prevent content from being illegally copied, the authority to view the content having been given to a specific user. As a result, a content holder can provide the content without anxiety. Moreover, the content separation control unit 310 may also be configured to manage the copyright of the subsidiary content. This also makes it possible to prevent the subsidiary content from being illegally copied.

Next, a specific example of the subsidiary content control receivers A 101, B 102 will be described. As shown in FIG. 2, the two subsidiary content control receivers A 101, B 102 are used in this embodiment. Here, it is assumed that both of them have the same function and configuration (except that ID information differs from each other). Therefore, in the description below, only the subsidiary content control receiver A 101 will be described. In addition, according to this embodiment, the number of subsidiary content control receivers is two. However, as a matter of course, the number of subsidiary content control receivers may also be three, four, or more. Moreover, this example will be described with a portable telephone being taken as an example of the subsidiary content control receiver. Portable equipment such as a portable video game machine may also be used as the subsidiary content control receiver so long as the portable equipment has a network function, and also has a function of transmitting/receiving control information and content information to/from the main content receiving display unit 100.

The subsidiary content control receiver A 101 includes a radio interface unit (sub) 420. The subsidiary content control receiver A 101 uses the radio interface unit (sub) 420 to perform two-way communications with the main content receiving display unit 100. First of all, transmission of data and information from the subsidiary content control receiver A 101 to the main content receiving display unit 100 will be described.

An operation unit 413 has a keyboard including a cursor key, numeric keys, and decision key. A user can select desired subsidiary content through the operation of these keys. To be more specific, subsidiary content is selected using a selection menu displayed on the display unit 411 and the keyboard.

Figure 3:
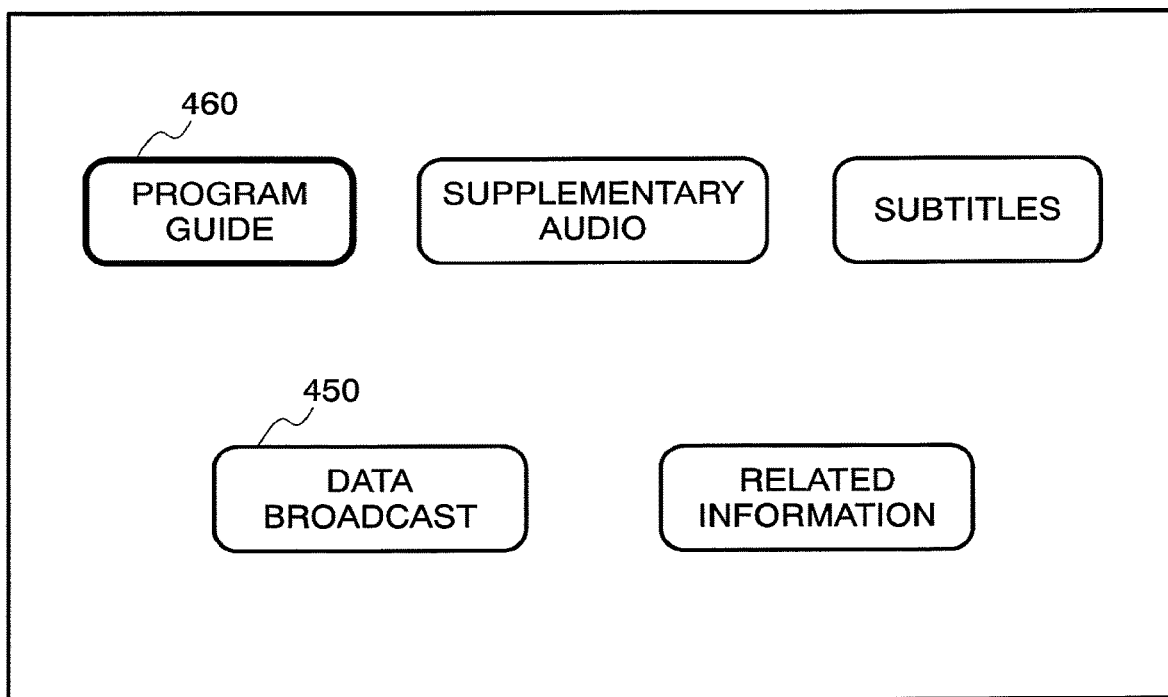
FIG. 3 is a diagram illustrating an example of a menu screen used to select subsidiary content, the menu screen being displayed on a subsidiary content control receiver.

When the user inputs an instruction to acquire the subsidiary content into the subsidiary content control receiver A 101, a CPU 401 displays, for example, a menu screen used to select subsidiary content as shown in FIG. 3 on the display unit 411 according to a program stored in a main memory 402. As seen in FIG. 3, this menu screen includes icons 450, each of which is used to select a kind of the subsidiary content. In this example, five icons 450 are displayed. The five icons 450 correspond to "Program guide", "Supplementary audio", "Subtitles", "Data broadcast", and "Related information" respectively.

The "Program guide" is the above-described electronic program guide (EPG). For example, a program guide whose format is similar to that of television program listings appearing in newspaper pages is displayed. The "Supplementary audio" is, for example, audio in other languages, such as second audio. For example, if Japanese is used as main audio, audio in English or Chinese is used as the supplementary audio. The "Subtitles" is subtitle data that is provided in synchronization with audio of the main content. The "Data broadcast" is, for example, data described in BML (Broadcast Markup Language). The "Data broadcast" is used to provide, for example, news, market information such as stock prices, weather forecast, and advertisement information such as commodities. In addition, the "Related information" is, for example, information relating to main content. For example, if the main content is a drama, the "Related information" includes the director and cast of the drama, and web page information (URL) of the drama. Further, if the main content is a commercial, the "Related information" includes information relating to a commodity introduced in the commercial. More specifically, the "Related information" includes, for example, a price of the commodity, the scheduled sale day, a manufacturer of the commodity, and web page information (URL) of the manufacturer. In the case of broadband content, a broadband communication path is utilized. Accordingly, in addition to the delivery of the same content information, it is also possible to deliver commercial information that suits user's age group, and user's taste. Thus, besides main commercials provided by main sponsors, it is also possible to provide each of the subsidiary content control receivers A 101, B 102 with commercial information corresponding to a user who possesses a terminal unit.

A user refers to a selection menu screen, which is displayed on the display unit 411 of the subsidiary content control receiver A 101, and then selects a desired kind of subsidiary content from among the five icons 450. This selection is made by moving a cursor 460 to the desired icon 450 by use of an unillustrated cursor key of the keyboard, and then by pressing an unillustrated decision key. In the example shown in FIG. 3, the cursor is positioned over the icon 450 corresponding to the "Program guide". This means that the "Program guide" is selected. Incidentally, in this example, the icon 450 is selected by use of the cursor key and the decision key. However, a display surface of the display unit 411 may also be provided with a touch panel so that each of the icons 450 can be selected by directly touching the display surface in question. This selection menu is hierarchized. It is possible to customize the selection menu on the basis of an operation history of the user. The selection menu is selectable by key operation.

When desired subsidiary content is selected, the CPU 401 generates an acquisition request to acquire the subsidiary content. Because the "Program guide" is selected in this example, the CPU 401 generates an acquisition request to acquire the "Program guide". Next, the CPU 411 reads out ID information specific to the subsidiary content control receiver A 101, the ID information being stored in the main memory. Then, the CPU 411 outputs the ID information and the generated acquisition request to a communication control unit 405 through a control i/F 404. As a matter of course, the subsidiary content control receiver B 102 stores ID information that differs from that of the subsidiary content control receiver A 101. After that, the communication control unit 405 associates the acquisition request with the ID information, and then transmits them from the radio interface unit (sub) 420 to the main content receiving display unit 100 side. Incidentally, although the ID information is stored in the main memory 402 in this example, the ID information may also be stored in, for example, a RAM in the CPU 401. In addition, the ID information includes: a kind of decryption method of each of the subsidiary content control receivers A 101, B 102; equipment information such as the resolution of the display unit 411; and user information used to identify an individual.

Subsequently, transmission of data and information from the main content receiving display unit 100 to the subsidiary content control receiver A 101 will be described. As described above, packet data of subsidiary content corresponding to the acquisition request is transmitted from the main content receiving display unit 100 together with the ID information transmitted from the subsidiary content control receiver A 101. The radio interface unit (sub) 420 receives the packet data to which the ID information is added. The packet data is then supplied to the communication control unit 405. Here, the communication control unit 405 includes a comparison unit and a decryption unit. The comparison unit compares the ID information, which is added to the received packet data, with ID information that is stored in the subsidiary content control receiver A 101 (more specifically, ID information stored in the main memory 402). As a result of the comparison, if both of them do not agree with each other, the received packet is discarded. If both of them agree with each other, the decoding unit decodes the received packet, and thereby data of the subsidiary content is reproduced. In addition to the ID information specific to the subsidiary content control receiver in question, the ID information may also include: a kind of a decoding function of the subsidiary content control receiver in question; the resolution of the display unit thereof; the performance of the CPU; a telephone number by which a user who possesses the subsidiary content control receiver in question can be identified; and settlement information.

The packet data of the subsidiary content coming from the main content receiving display unit 100 can also be received by the subsidiary content control receiver B 101. However, because the ID information which is added to the packet data in question (that is to say, the ID information specified to the subsidiary content control receiver A 101) differs from the ID information that is stored in the subsidiary content control receiver B 102, the packet data in question is discarded in the subsidiary content control receiver B 102. As a result, it is possible to acquire subsidiary content on a subsidiary content control receiver basis.

The subsidiary content data, which has been decoded and reproduced by the communication control unit 405, is supplied to a stream control unit 408 and a medium processing/display control unit 409 through a content data I/F 407. The medium processing/display control unit 409 uses a working memory 410 to perform specified image processing of image data of the subsidiary content, and to perform specified audio processing of audio data of the subsidiary content. The image data of the subsidiary content, which has been subjected to the image processing by the medium processing/display control unit 409, is supplied to the display unit 411 so that the image data is displayed. On the other hand, the audio data of the subsidiary content, which has been subjected to the audio processing, is supplied to a speaker 306 so that the audio data is output. As a result, it is possible to view the subsidiary content by use of, for example, the subsidiary content control receiver A 101 that is formed of a portable telephone, or the like.

In addition, a security control unit 403 also has a function of managing information including: information about contract channels as fee-based services, and billing thereof; information used for the copyright protection; and information about the copyright of video content. Then, for example, user contractual coverage of a digital broadcast of a desired channel is checked by use of the above-described management information. If necessary, authentication processing and decryption processing are performed. This makes it possible to prevent content from being illegally copied, the authority to view the content having been given to a specific user. As a result, a content holder can provide the content without anxiety. If the subsidiary content control receiver in question is a portable telephone, the security control unit 403 may also perform the charging and settlement processing relating to viewed content by utilizing functions of the portable telephone. If each of the subsidiary content control receivers A 101, B 102 includes a storage medium (a SD card, a small-size HOD, or the like), it is also possible to download content to the storage medium by including the authorization to view the content in the above-described ID information. Accordingly, it also becomes possible to carry information of the main content.

Figure 4:
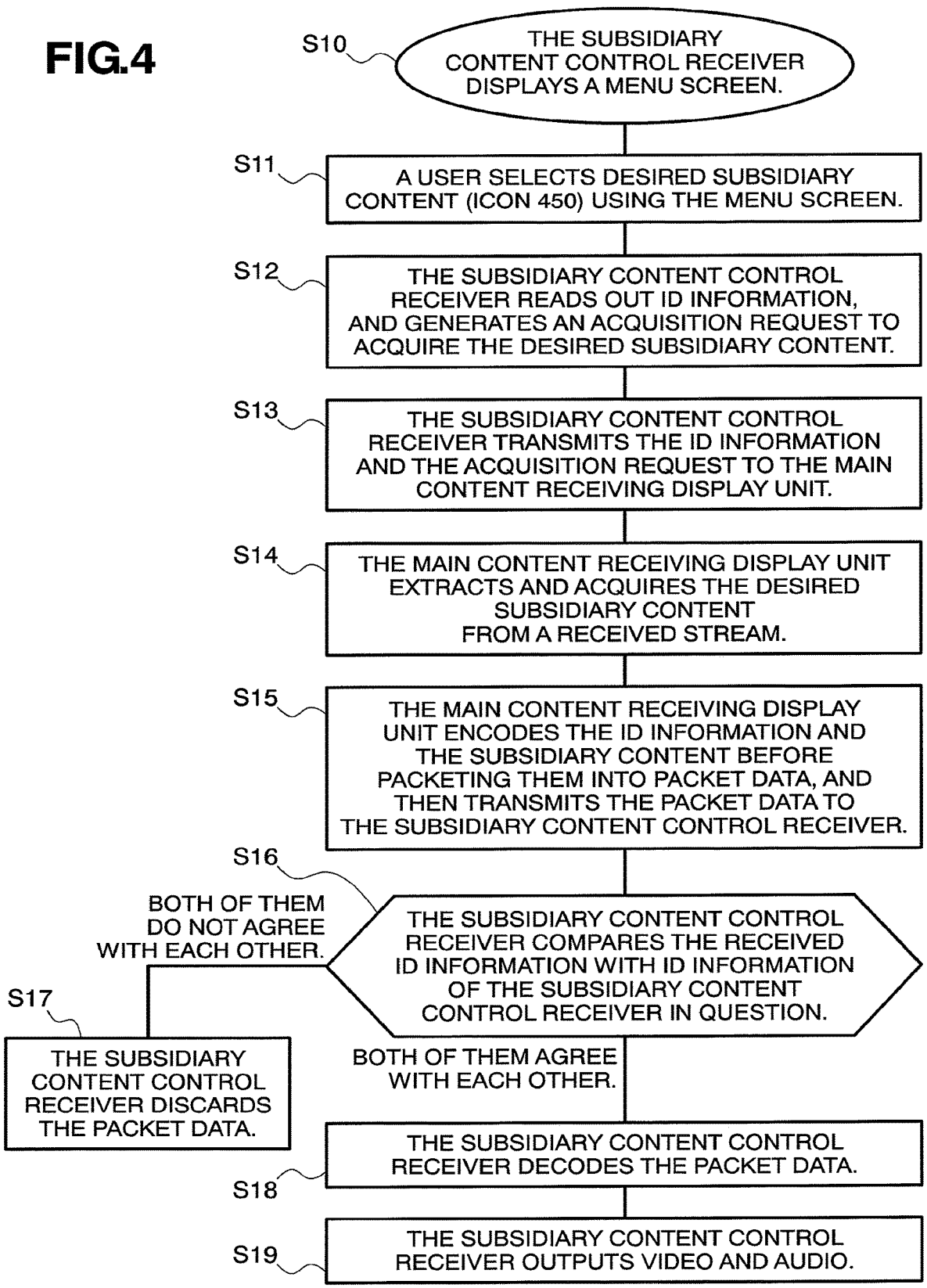
FIG. 4 is a diagram illustrating as an example the flow of how to acquire subsidiary content.

The process flow of how to acquire subsidiary content of the above-described contents receiving system according to this embodiment will be schematically described with reference to FIG. 4. In FIG. 4, steps S10 through S13 and S16 through S19 are processing on the subsidiary content control receiver side, whereas steps S14 through S15 are processing on the main content receiving display unit 100 side.

First of all, in the step S10, the menu screen used to select subsidiary content, which is shown in FIG. 3, is displayed. In the step S11, a user selects the icon 450 corresponding to a kind of desired subsidiary content while viewing the menu screen. Next, in the step S12, the CPU 401 generates an acquisition request to acquire the subsidiary content corresponding to the selected icon 450, and then reads out ID information from the main memory 402. Subsequently, in the step S13, a communication control unit 405 adds the ID information to the acquisition request, and then transmits the acquisition request to the main content receiving display unit 100 through the radio interface unit (sub) 420.

In the step S14, the content separation control unit 310 of the main content receiving display unit 100 acquires a kind of the subsidiary content indicated by the acquisition request, a kind of encoding that is to be subjected to decoding so as to generate reproducible subsidiary content, and resolution information of the display unit 411. The content separation control unit 310 then authenticates the connection to the subsidiary content control receiver A 101 or B 102 to which the user is allowed to connect so that corresponding subsidiary content is extracted from the received stream as a result of the separation of a received stream. Incidentally, as described above, the ID information which has been added to the acquisition request is temporarily stored in the request information input/transmission control unit 313. After that, the request information input/transmission control unit 313 compresses and encodes the stored ID information and the extracted subsidiary content, and further converts them into packets. The packets are then transmitted to the subsidiary content control receiver side through the radio interface unit (main) 320.

Subsequently, in the step S16, the communication control unit 405 of the subsidiary content control receiver in question compares ID information included in the packet data transmitted from the main content receiving display unit 100 with ID information of the subsidiary content control receiver in question. Here, if both of them do not agree with each other, the process proceeds to the step S17 where the received packet data is discarded. If they agree with each other, the process proceeds to the step S18 where the communication control unit 405 decodes the subsidiary content. Lastly, in the step S19, video data of the decoded subsidiary content is output by the display unit 411, and/or audio data of the decoded subsidiary content is output by the speaker 412.

Thus, according to this embodiment, because it becomes possible to request, acquire, and view the subsidiary content on a subsidiary content control receiver basis, it is possible to achieve the personalization of the subsidiary content. Moreover, on the basis of the personalized subsidiary content and the main content, it is possible to acquire favorite information with the family members or on an individual basis. Therefore, it is possible to achieve a new viewing style.

Incidentally, as shown in FIG. 3, one menu screen is used to select the subsidiary content in this embodiment. However, it may also be so configured that a plurality of menu screens are hierarchically provided to allow a user to select subsidiary content by use of the plurality of menu screens. For example, when an icon corresponding to the "Data broadcast" is selected in the menu screen, another menu screen, which is constituted of icons each corresponding to a kind of "Data broadcast" (for example, "News", "Market information", and "Weather forecast"), is displayed so that the menu screen is used to select subsidiary content.

In addition, the radio interface unit may also use, for example, a wireless network such as a wireless LAN.

Figure 5:
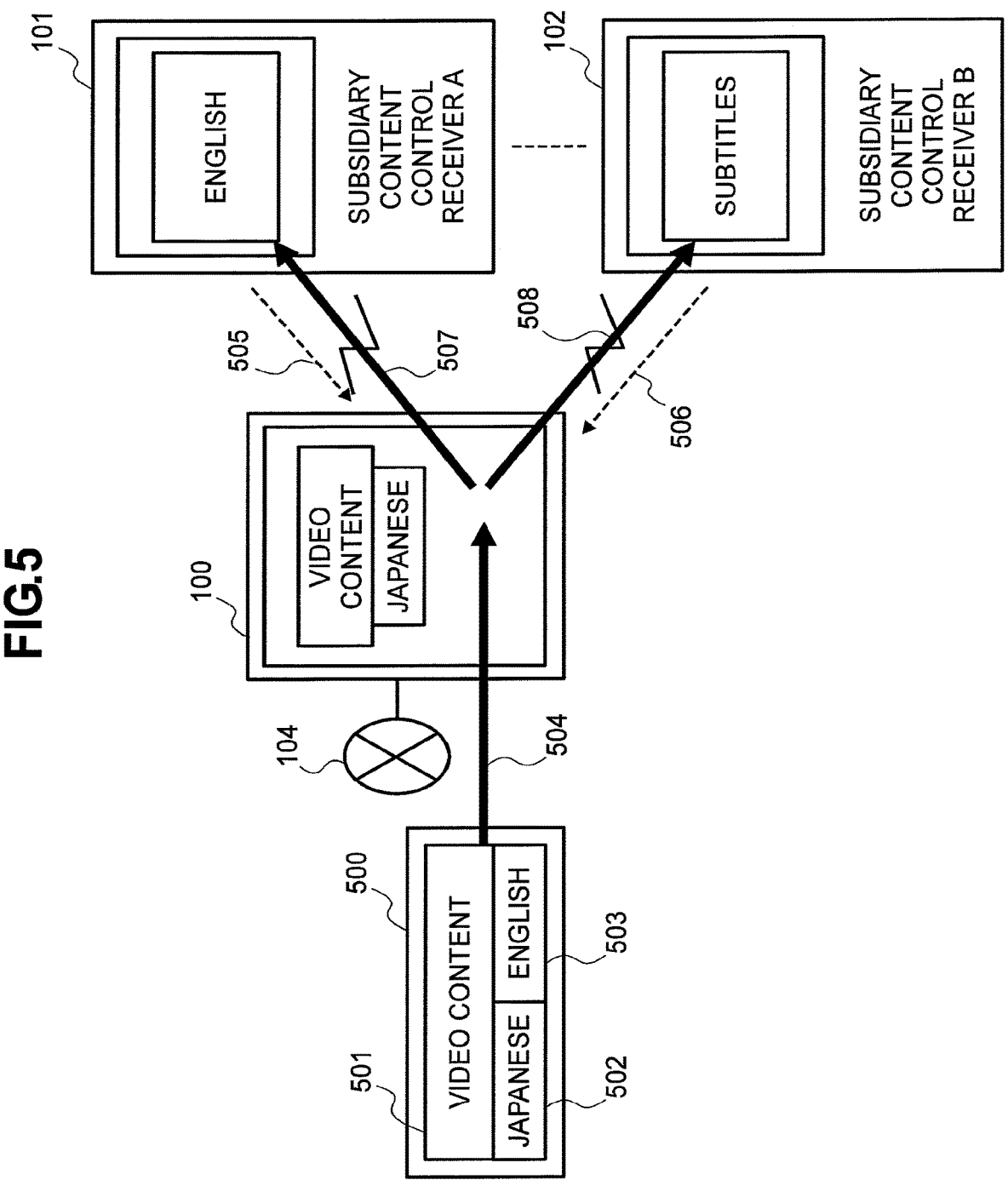
FIG. 5 is a diagram illustrating one specific example of the acquisition of subsidiary content.

Next, one specific example of the acquisition of subsidiary content according to this embodiment will be described with reference to FIG. 5. Because specific processing of each subsidiary content control receiver which uses ID information is the same as that described above, description thereof will be omitted here. FIG. 5 is a diagram illustrating as an example the flow of content acquisition that uses broadband Internet. A stream which includes movie content corresponding to multi-languages is delivered from a content delivery unit. This stream 500 includes: video content 501 that is handled as main content; and Japanese audio data 502 and English audio data 503, both of which are handled as subsidiary content.

The subsidiary content control receiver A 101 transmits an acquisition request 505 to acquire English audio data, and ID information, to the main content receiving display unit 100. Here, the English audio data is second audio data accompanying the movie content. The main content receiving display unit 100 analyzes the received data, and then judges that the received data includes the acquisition request to acquire the English audio data. Accordingly, the main content receiving display unit 100 extracts the English audio data 505, which is the second audio data, from the video content 504 received from the broadband Internet. Then, the main content receiving display unit 100 transmits the extracted English audio data 505 to the subsidiary content control receiver A 101 together with ID information of the subsidiary content control receiver A 101.

On the other hand, the subsidiary content control receiver B 102 transmits an acquisition request 506 to acquire subtitle data accompanying the movie content, and ID information, to the main content receiving display unit 100. The main content receiving display unit 100 analyzes the received data, and then judges that the received data includes the acquisition request to acquire the subtitle data. Accordingly, the main content receiving display unit 100 extracts the subtitle data 503 from the video content 504 received from the broadband Internet, and then transmits the extracted subtitle data 503 to the subsidiary content control receiver B 101 together with ID information of the subsidiary content control receiver B 102.

The main content receiving display unit 100 supplies the video content that is the main content, and also provides a viewing environment based on Japanese audio. In addition to them, the main content receiving display unit 100 supplies the subsidiary content to each of the subsidiary content control receivers A 101, B 102 in response to a request from one or more users to acquire desired subsidiary content.

As a result, even if the family members are viewing the same movie title, it is possible to provide a different viewing environment (for example, viewing with English audio data, and viewing with Japanese audio data) on an individual basis.

Figure 6:
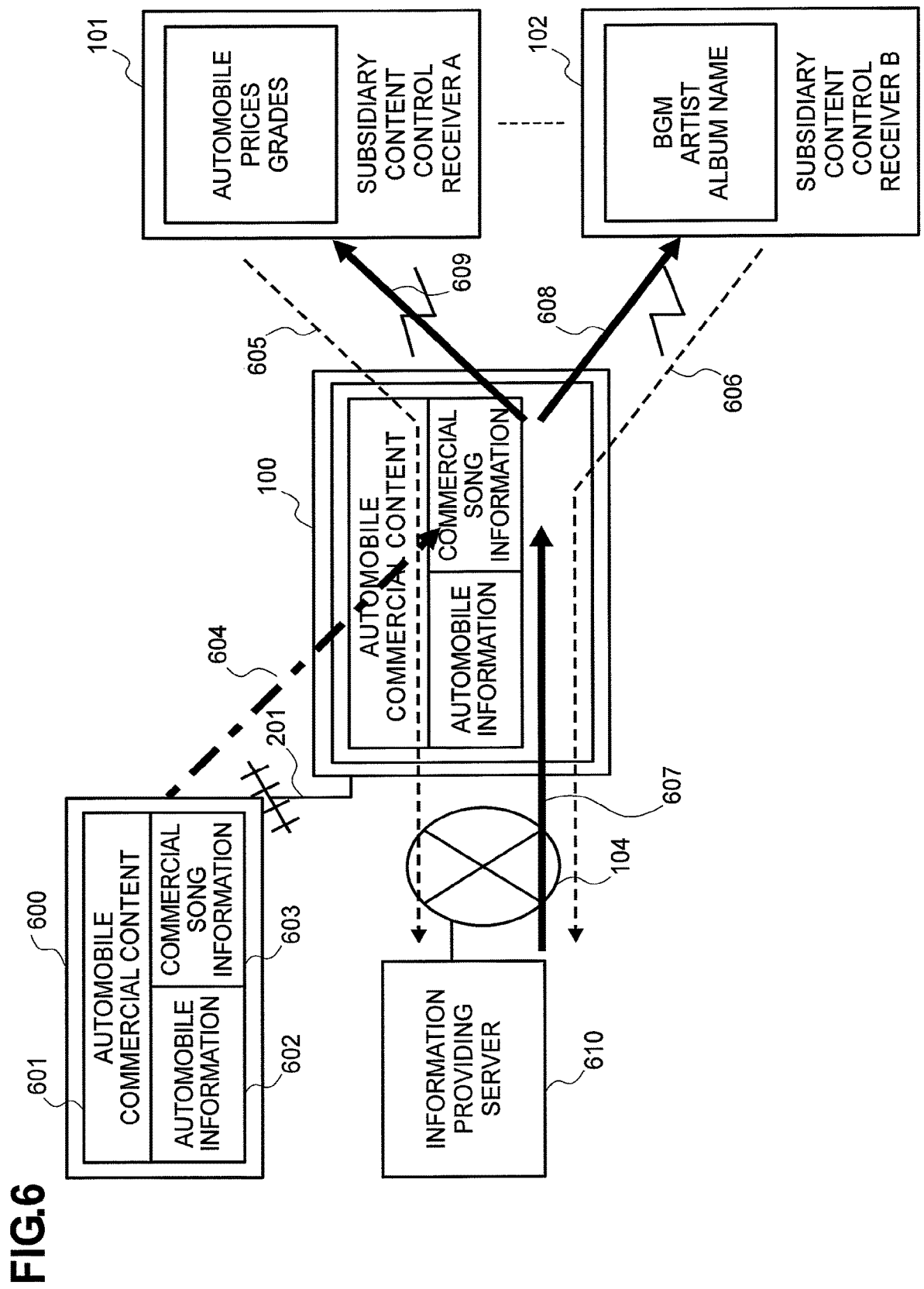
FIG. 6 is a diagram illustrating another specific example of the acquisition of subsidiary content.

Next, another specific example of the acquisition of subsidiary content according to this embodiment will be described with reference to FIG. 6. Because specific processing of each subsidiary content control receiver which uses ID information is the same as that described above, description thereof will be omitted here. FIG. 6 is a diagram illustrating as an example the flow of the content acquisition that uses a broadcast wave and broadband. This example is a case where automobile commercial content is viewed from the broadcast wave. A stream 600 coming from the broadcast wave includes: the automobile commercial content 601 that is the main content; automobile information 602 including a URL of a home page of an automobile manufacturer, and prices are grades; and commercial song information 603. The automobile information 602 and the commercial song information 603 are the subsidiary content, and accompany the automobile commercial content 601.

The subsidiary content control receiver A 102 transmits an acquisition request 605 to acquire the automobile information 602, which accompanies broadcast wave video content information 600, to the main content receiving display unit 100 together with ID information. The main content receiving display unit 100 analyzes the received data, and then judges that the received data includes the acquisition request to acquire the automobile information. Then, the main content receiving display unit 100 analyzes metadata information including URLs of Web sites from the video content 604 received through the broadband Internet so as to extract the automobile information. The automobile information is transmitted to the subsidiary content control receiver A 101 together with the ID information of the subsidiary content control receiver A 101. The subsidiary content control receiver A 101 accesses an information providing server 610 on the basis of the URL information included in the automobile information to acquire the automobile information including desired prices and grades from the information providing server 610 so that the automobile information is displayed. If the subsidiary content control receiver A 101 is a portable telephone, it is also possible to acquire information by accessing the information providing server 610 through a portable telephone network.

On the other hand, the subsidiary content control receiver B 102 transmits an acquisition request 606 to acquire information relating to BGM (Back Ground Music) of an automobile commercial to the main content receiving display unit 100 together with ID information. The main content receiving display unit 100 analyzes the received data, and thereby judges that the received data includes a request to acquire commercial song information accompanying the automobile commercial content 601. After that, the main content receiving display unit 100 extracts the commercial song information 603 from the video content information 600 received from the broadcast wave, and then transmits the commercial song information 603 to the subsidiary content control receiver B 102 together with the ID information of the subsidiary content control receiver B 102. The subsidiary content control receiver B 102 accesses the information providing server 610 on the basis of the URL information to acquire, from the information providing server 610, information including a title of a desired commercial song (BGM), an artist name, and an album name so that the acquired information is displayed. If the subsidiary content control receiver B 102 is a portable telephone, it is also possible to acquire the information by accessing the information providing server 610 through the portable telephone network.

As a result, even if the family members are viewing automobile commercial content information, it is possible to acquire the automobile information and the commercial song information on an individual basis. Therefore, it becomes possible to provide a new CM viewing environment that could not be achieved by the conventional technologies. Moreover, by sharing a television set located in a living room among the family members, and by possessing each subsidiary content control receiver by each family member, it becomes possible to enjoy a digital life style that differs from the conventional ones, the digital life style in question being based on not only the main content information but also the subsidiary content information corresponding to user's taste.

Figure 7:
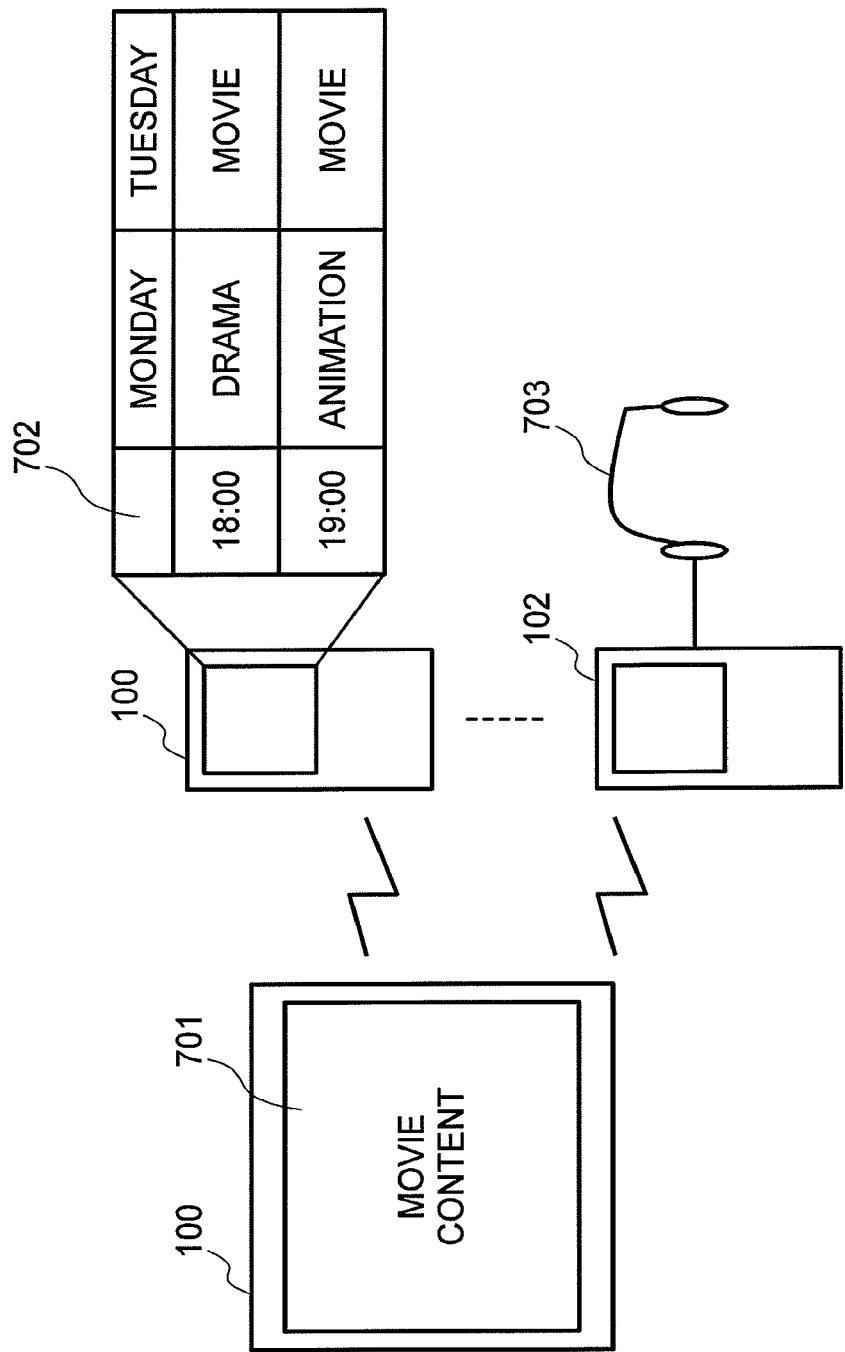
FIG. 7 is a diagram illustrating another specific example of a system.

Still another specific example of this embodiment will be described with reference to FIG. 7. Heretofore, while a broadcast program from a broadcast wave and a broadband is viewed, it is possible to make programmed recording by use of EP data 702. In this case, because a screen of a television receiver is also used as a user operation screen, both movie content 701 and EPG content 702 are displayed on one screen during the programmed recording operation. In contrast to this, in this example, if a user wants to continuously view the movie content 701, it is possible to display the EPG data, which is the subsidiary content, by use of each of the subsidiary content control receivers A 101, B 102 at hand. This enables the main content receiving display unit 100 to continuously display only the video content with high image quality on a large screen.

When the movie content 701 is being viewed, a user who possesses the subsidiary content control receiver A 101 can display the EPG screen 702 thereon to make a programmed recording of a desired broadcast program at hand. In addition, another user can use the subsidiary content control receiver B 102 to listen to second audio information of the movie content 701 through a headphone 703. As a result, while the main content is displayed by the main content receiving display unit 100, it is possible for a user to check EPG, ECG, or the like, or to make a programmed recording with reference to the EPG, ECG, or the like, by use of a subsidiary content control receiver held by the user.

Second Embodiment

In the above-described embodiment, the ID information is determined on a subsidiary content control receiver basis. Any ID information may also be used so long as each subsidiary content control receiver can be identified. For example, if subsidiary content control receivers can communicate through a network, an IP address, which is assigned to each subsidiary content control receiver, can also be used as the ID information. This IP address may be a local address, or may also be a global address that can be used in the Internet.

An embodiment in which ID information is used as an IP address will be described with reference to FIG. 6. FIG. 8 is a table illustrating table information stored in the main content receiving display unit 100. In the table, each of the subsidiary content control receivers A 101, B 102 is associated with request information, and an IP address of the each subsidiary content control receiver. The request information indicates a kind of subsidiary content including EPG data, English audio data, subtitle data, ECG data, and URL information of a Web site. Any kind of subsidiary content may also be used so long as it accompanies main content such as video content. Here, by associating the request information with an IP address of a corresponding subsidiary content control receiver beforehand, the main content receiving display unit 100 can provide desired content information on the basis of this table. The table shown in FIG. 8 is merely an example. Therefore, the IP address may also be an ID specific to each apparatus used for communications, such as a global address of IPv6 (Internet Protocol version 6), and a telephone number of a portable telephone.

This embodiment can be applied to a system that is capable of receiving a stream including main content and subsidiary content, and that is capable of separating the stream into the main content and the subsidiary content to supply a main display unit and a sub display unit with the main content and the subsidiary content.

What is claimed is:

1. An audio content reproducing system comprising:
a main terminal; first subsidiary terminal; and second subsidiary terminal, wherein the main terminal comprises:
a storage storing the audio content which is comprising at least first audio data and second audio data, the second audio data being different from the first audio data;
a first speaker outputting the audio content; and
a first controller controlling transmission/reception with the first subsidiary terminal and the second subsidiary terminal, and decoding the audio content,
wherein the first controller is configured to:
store first device specific identification (ID) information of the first subsidiary terminal and second device specific ID information of the second subsidiary terminal into the storage,
store association information for transmitting the first audio data of the audio content or the second audio data of the audio content to one of the first subsidiary terminal or the second subsidiary terminal into the storage,
encode the first audio data and the second audio data, and
transmit the encoded first audio data or the encoded second audio data to one of the first subsidiary terminal or the second subsidiary terminal via a first wireless communication circuitry,
wherein the association information defines that the first audio data is associated with the first device specific ID information and the second audio data is associated with the second device specific ID information,
wherein the first subsidiary terminal comprises:
a second speaker; a second wireless communication circuitry; and
a second controller configured to:
control transmission/reception with the main terminal;
decode the encoded first audio data received from the main terminal;
store the first device specific ID information for identifying the first subsidiary terminal; and
transmit the first device specific ID information to the main terminal when connecting to the main terminal via the second wireless communication circuitry,
wherein the second subsidiary terminal comprises:
a third speaker; a third wireless communication circuitry; and
a third controller configured to:
control transmission/reception with the main terminal;
decode the encoded second audio data received from the main terminal;
store the second device specific ID information for identifying the second subsidiary terminal; and
transmit the second device specific ID information to the main terminal when connecting to the main terminal via the third wireless communication circuitry.

2. The audio content reproducing system according to claim 1,
wherein the main terminal is further comprising a network interface and is configured to acquire the audio content from an external server via the network interface.

3. The audio content reproducing system according to claim 1,
wherein the first controller is configured to authenticate a connection between the subsidiary terminals.

4. The audio content reproducing system according to claim 1,
wherein the main terminal further comprises a first media processor and a first display, and
wherein the first media processor is configured to reproduce video content and display the reproduced video content on the first display.

5. The audio content reproducing system according to claim 4,
wherein the main terminal further comprises a network interface and is configured to acquire the video content from an external server via the network interface.

6. The audio content reproducing system according to claim 1,
wherein the subsidiary terminal further comprises a second media processor and a second display, and
wherein the second media processor is configured to reproduce video content and display the reproduced video data on the second display.

7. The audio content reproducing system according to claim 1,
wherein the main terminal comprises a converter for down-converting the audio content and is configured to transmit the down-converted audio content to the subsidiary terminals.

8. The audio content reproducing system according to claim 1,
wherein data format of the audio content is AAC (Advanced Audio Coding) or MP3 (MPEG-1 Audio Layer-3).

9. The audio content reproducing system according to claim 4,
wherein data format of the video content is MEPG-4 or H.264.

10. The audio content reproducing system according to claim 6,
wherein data format of the video content is MEPG-4 or H.264.

11. The audio content reproducing system according to claim 1,
wherein in case where the association information defines that the second audio data is associated with the first device specific ID information and the first audio data is associated with the second device specific ID information,
the main terminal is configured to transmit the encoded second audio data to the first subsidiary terminal and transmit the encoded first audio data to the second subsidiary terminal;
the first subsidiary terminal is configured to output the second audio data to the second speaker; and
the second subsidiary terminal is configured to output the first audio data to the third speaker.

12. An audio content transmitting terminal comprises:
a storage storing the audio content which is comprising at least first audio data and second audio data, the second audio data being different from the first audio data;
a speaker outputting the audio content; and
a controller configured to:
control transmission/reception with first subsidiary terminal and second subsidiary terminal via a wireless communication circuitry; and
decode the audio content,
wherein the controller is further configured to:
store first device specific identification (ID) information of the first subsidiary terminal and second device specific ID information of the second subsidiary terminal into the storage;
store association information for transmitting the first audio data of the audio content or the second audio data of the audio content to one of the first subsidiary terminal or the second subsidiary terminal into the storage;
encode the first audio data and the second audio data; and
transmit the encoded first audio data or the encoded second audio data to one of the first subsidiary terminal or the second subsidiary terminal via the wireless communication circuitry,
wherein in case where the association information defines that the first audio data is associated with the first device specific ID information and the second audio data is associated with the second device specific ID information, the controller is configured to transmit the encoded first audio data to the first subsidiary terminal and transmit the encoded second audio data to the second subsidiary terminal based on the association information.

13. The audio content transmitting terminal according to claim 12, further comprising a network interface,
wherein the controller is configured to acquire the audio content from an external server via the network interface.

14. The audio content transmitting terminal according to claim 12,
wherein the controller is configured to authenticate a connection between the first subsidiary terminal and the second subsidiary terminal.

15. The audio content transmitting terminal according to claim 12, further comprises a first media processor and a display,
wherein the first media processor is configured to reproduce video content and the display is configured to display the reproduced video content.

16. The audio content transmitting terminal according to claim 15, further comprises a network interface,
wherein the controller is configured to acquire the video content from an external server via the network interface.

17. The audio content transmitting terminal according to claim 12, further comprises a converter for down-converting the audio content,
wherein the controller is configured to transmit the down-converted audio content to the first subsidiary terminal and the second subsidiary terminal.

18. The audio content transmitting terminal according to claim 12,
wherein data format of the audio content is AAC (Advanced Audio Coding) or MP3 (MPEG-1 Audio Layer-3).

19. The audio content transmitting terminal according to claim 12,
wherein data format of the video content is MEPG-4 or H.264.

20. The audio content transmitting terminal according to claim 12,
wherein in case where the association information defines that the second audio data is associated with the first device specific ID information and the first audio data is associated with the second device specific ID information, the controller is configured to transmit the encoded second audio data to the first subsidiary terminal and transmit the encoded first audio data to the second subsidiary terminal based on the association information.

* * * * *